US011240545B2

(12) United States Patent
Zimmerman et al.

(10) Patent No.: US 11,240,545 B2
(45) Date of Patent: Feb. 1, 2022

(54) DISPLAYING NON-TIME BOUND CONTENT IN A TIME BOUND GRID

(71) Applicant: OpenTV, Inc., San Francisco, CA (US)

(72) Inventors: Danielle Maslow Zimmerman, East Palo Alto, CA (US); David Daniel Kempe, San Jose, CA (US); Crx K. Chai, Oakland, CA (US); Alex Fishman, San Francisco, CA (US); Colin Shengcai Zhao, Sunnyvale, CA (US); Andrea Wheeler, San Francisco, CA (US)

(73) Assignee: OPENTV, INC., San Francisco, CA (US)

(*) Notice: Subject to any disclaimer, the term of this patent is extended or adjusted under 35 U.S.C. 154(b) by 0 days.

(21) Appl. No.: 16/750,533

(22) Filed: Jan. 23, 2020

(65) Prior Publication Data

US 2020/0267438 A1    Aug. 20, 2020

Related U.S. Application Data

(63) Continuation of application No. 15/694,619, filed on Sep. 1, 2017, now Pat. No. 10,582,245.
(Continued)

(51) Int. Cl.
*H04N 21/262* (2011.01)
*H04N 21/462* (2011.01)
(Continued)

(52) U.S. Cl.
CPC ... *H04N 21/26283* (2013.01); *H04N 21/4312* (2013.01); *H04N 21/4622* (2013.01);
(Continued)

(58) Field of Classification Search
CPC ......... H04N 21/26283; H04N 21/4312; H04N 21/8456; H04N 21/4622; H04N 21/4668; H04N 21/4821; H04N 21/4532
See application file for complete search history.

(56) References Cited

U.S. PATENT DOCUMENTS 6,177,931 B1    1/2001   Alexander et al.
8,925,017 B1 * 12/2014   Howard, Jr. ....... H04N 21/4782
                                                          725/51
(Continued)

FOREIGN PATENT DOCUMENTS

CN        109792500       5/2019
IN       201917009204     5/2019
(Continued)

OTHER PUBLICATIONS

U.S. Appl. No. 15/694,619 U.S. Pat. No. 10,582,245, filed Sep. 1, 2017, Displaying Non-time Bound Content in a Time Bound Grid.
(Continued)

*Primary Examiner* — Benjamin R Bruckart
*Assistant Examiner* — Tien M Nguyen
(74) *Attorney, Agent, or Firm* — Schwegman Lundberg & Woessner, P.A.

(57) ABSTRACT

Systems and methods for generating and displaying a non-time bound content channel in a time-bound grid is provided. The system comprises receiving content data representing non-time bound content to be displayed in the time bound grid. The system generates the time bound grid, by creating, based on the content data, a non-time bound content channel. The non-time bound content channel displays one or more content objects representing the non-time bound content in the time bound grid. The system incorporates the non-time bound content channel with a plurality of time bound channels in the time bound grid. The system then
(Continued)

causes display of the generated time bound grid on a viewing device of a user.

19 Claims, 9 Drawing Sheets

Related U.S. Application Data

(60) Provisional application No. 62/383,255, filed on Sep. 2, 2016.

(51) Int. Cl.
    *H04N 21/431*     (2011.01)
    *H04N 21/466*     (2011.01)
    *H04N 21/482*     (2011.01)
    *H04N 21/45*     (2011.01)
    *H04N 21/845*     (2011.01)

(52) U.S. Cl.
    CPC ..... *H04N 21/4668* (2013.01); *H04N 21/4821* (2013.01); *H04N 21/8456* (2013.01); *H04N 21/4532* (2013.01)

(56) References Cited

U.S. PATENT DOCUMENTS

| | | | |
|---|---|---|---|
| 10,003,849 B1* | 6/2018 | Killick | H04N 21/4532 |
| 10,582,245 B2 | 3/2020 | Zimmerman et al. | |
| 2002/0059094 A1 | 5/2002 | Hosea et al. | |
| 2002/0138834 A1 | 9/2002 | Gerba et al. | |
| 2002/0178446 A1 | 11/2002 | Sie et al. | |
| 2003/0122878 A1* | 7/2003 | Schlarb | H04N 21/4782 715/826 |
| 2006/0107304 A1* | 5/2006 | Cleron | H04N 21/4821 725/135 |
| 2006/0117260 A1 | 6/2006 | Sloo et al. | |
| 2009/0044223 A1 | 2/2009 | Jiang et al. | |
| 2010/0262995 A1 | 10/2010 | Woods et al. | |
| 2012/0204201 A1 | 8/2012 | Cassidy et al. | |
| 2014/0082645 A1* | 3/2014 | Stern | H04N 21/44222 725/13 |
| 2015/0189388 A1 | 7/2015 | Devassykutty et al. | |
| 2017/0070786 A1* | 3/2017 | Keene | G06F 3/0482 |
| 2018/0070121 A1 | 3/2018 | Zimmerman et al. | |

FOREIGN PATENT DOCUMENTS

| | | |
|---|---|---|
| KR | 20130000242 A | 1/2013 |
| WO | 2018045352 | 3/2018 |

OTHER PUBLICATIONS

"International Application Serial No. PCT/US2017/049966, International Search Report dated Nov. 16, 2017", 2 pgs.
"International Application Serial No. PCT/US2017/049966, Written Opinion dated Nov. 16, 2017", 4 pgs.
"U.S. Appl. No. 15/694,619, Non Final Office Action dated Jul. 12, 2018", 11 pgs.
"U.S. Appl. No. 15/694,619, Response filed Nov. 13, 2018 to Non Final Office Action dated Jul. 12, 2018", 11 pgs.
"U.S. Appl. No. 15/694,619, Final Office Action dated Feb. 5, 2019", 15 pgs.
"U.S. Appl. No. 15/694,619, Examiner Interview Summary dated Mar. 4, 2019", 3 pgs.
"International Application Serial No. PCT/US2017/049966, International Preliminary Report on Patentability dated Mar. 14, 2019", 6 pgs.
"U.S. Appl. No. 15/694,619, Response filed May 6, 2019 to Final Office Action dated Feb. 5, 2019", 12 pgs.
"U.S. Appl. No. 15/694,619, Examiner Interview Summary dated May 16, 2019", 3 pgs.
"U.S. Appl. No. 15/694,619, Non Final Office Action dated May 23, 2019", 22 pgs.
"European Application Serial No. 17847663.6, Extended European Search Report dated Jun. 6, 2019", 7 pgs.
"U.S. Appl. No. 15/694,619, Response filed Aug. 23, 2019 to Non-Final Office Action dated May 23, 2019", 12 pgs.
"U.S. Appl. No. 15/694,619, Notice of Allowance dated Oct. 30, 2019", 19 pgs.
"European Application Serial No. 17847663.6, Response filed Jan. 3, 2020 to Extended European Search Report dated Jun. 6, 2019", 19 pgs.
"European Application Serial No. 17847663.6, Communication Pursuant to Article 94(3) EPC dated Jul. 27, 2020", 5 pgs.
"European Application Serial No. 17847663.6, Response filed Dec. 4, 2020 to Communication Pursuant to Article 94(3) EPC dated Jul. 27, 2020", 13 pages.
"Chinese Application Serial No. 201780061188.2, Response filed Apr. 19, 2021 to Office Action dated Dec. 16, 2020", with English claims, 65 pages.
"Chinese Application Serial No. 201780061188.2, Office Action dated May 11, 2021", with English translation, 16 pages.
"European Application Serial No. 17847663.6, Summons to Attend Oral Proceedings mailed Jul. 23, 2021", 6 pgs.
"Chinese Application Serial No. 201780061188.2, Response filed Jul. 14, 2021 to Office Action dated May 11, 2021", w English Claims, 9.
"Indian Application Serial No. 201917009204, First Examination Report dated Nov. 26, 2021", 5 pages, with English translation.

* cited by examiner

| 8:02PM | 8:00PM | 8:30PM | 9:00PM | 9:30PM | 10:00PM |
|---|---|---|---|---|---|
| 1000 VOD | GIRLS | | BETTER CALL SAUL | THE MARTIAN | |
| 2000 NETFLIX | HOUSE OF CARDS SEASON4,EP12 | | JESSICA JONES | INTERSTEL. | |
| 007 ABC | MODERN FAMILY | | MARVEL'S AGENTS | NASHVILLE | |
| 206 ESPN | WARRIORS VS SPURS | | | | |
| 212 BBC | TOP GEAR | | DOCTOR WHO | THE MUSKETEERS | |
| 227 AMC | MAD MAN | | THE GODFATHER | | |

NETFLIX
HOUSE OF CARDS
As the hostage situation continues, Claire secretly negotiates with Yusif al Ahmadi. Frank confronts Hammerschmidt.
Season 4, Episode 12 | First Airing: March 4, 2006 | 50 min | TV MA

FIG. 3A

| 8:02PM | 8:00PM | 8:30PM | 9:00PM | 9:30PM | 10:00PM |
|---|---|---|---|---|---|
| 1000 VOD | GIRLS | | BETTER CALL SAUL | THE MARTIAN | |
| 2000 NETFLIX | GAME OF THRONES SEASON3, EP1 | | GAME OF THRONES SEASON3, EP2 | | GAME OF T SEASON3, E |
| 007 ABC | MODERN FAMILY | | MARVEL'S AGENTS | | NASHVILLE |
| 206 ESPN | WARRIORS VS SPURS | | | | |
| 212 BBC | TOP GEAR | | DOCTOR WHO | THE MUSKETEERS | |
| 227 AMC | MAD MAN | | THE GODFATHER | | |

GAME OF THRONES
GAME OF THRONES

Jon is brought before the King Beyond the Wall; Tyrion asks for his reward; Little finger offers Sansa a way out.

Season 3, Episode 1 | First Airing: March 21, 2013 | 50 min | TV MA

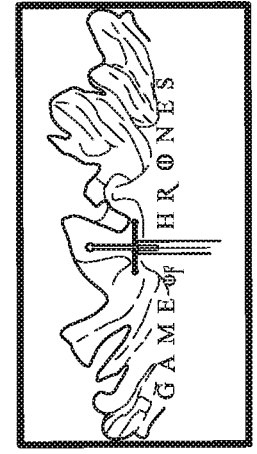

FIG. 3B

TV GUIDE — Wed 31 Aug 10:18 pm

◁ Today ▷

| | 10:00pm | 10:30 | 11:00 | 11:30 | 12:00 | |
|---|---|---|---|---|---|---|
| 1 RTL | News | Bus... | CrossTalk | News | Int... | Documentary | News | Int... |
| 2 ASTRA | Ultra-HD-Sender von Astra und HD+ | | | | | |
| 2 arte | Rudolf Nouree... | Layla | | | | Les gra... |
| 3 Bloomberg | Charlie Rose | Bloomberg West | | Daybreak Asia | | |
| 4 CNN | Amanpour | World Sport | State of the Race W... | CNN Today | CNN Today | |
| VOD | The Artist | | | Treasures of Ancient Egypt: The Go | | |
| wuaki | El gruñón | | | Top Gun (3D) | | |

Charlie Rose
Series
10:00 – 11:00 pm

○ Sort ○ Filter Channels

| Today | 8:00p | 8:30p | 9:00p | 9:30p | 10:00p | 10:30p |
|---|---|---|---|---|---|---|
| 001 | Unplugged | | The Get Down | | Unplugg | |
| FOX 002 | The Jungle Book | | Dexter | The Newsroom | | |
| aMC 227 | Mad Men | Better Call Saul | | | The Walking De | |
| 249 | Comedy Central Presents | Key & Peel | Kevin Hart: Seriously Funny | | | |
| HBO 501 | The News Room | Game of Thrones | | Silicon Valley | S | |
| SCIFZZ 520 | First Look: The Martian | The Girlfriend Expereince | | Outlander | | | aMC 227

Mad Men
The Runaways (Se 7, Ep 5) | R | 44m | Drama
Don has a visitor from his past. Peggy helps Ginsberg with a problem 8:06 PM
62° Partly Sunny Stanger Things

DISPLAYING NON-TIME BOUND CONTENT IN A TIME BOUND GRID

RELATED APPLICATIONS

The present application is a continuation of U.S. patent application Ser. No. 15/694,619, filed on Sep. 1, 2017, which claims the priority benefit of U.S. Provisional Patent Application Ser. No. 62/383,255, filed on Sep. 2, 2016, the disclosures of each of which are incorporated herein by reference in their entireties.

FIELD

The present disclosure generally relates to machines configured to the technical field of special-purpose machines that facilitate display of digital content including computerized variants of such special-purpose machines and improvements to such variants, and to the technologies by which such special-purpose machines become improved compared to other special-purpose machines that facilitate display of digital content. In particular, the present disclosure addresses systems and methods to present non-time bound content in a time bound grid and, in a specific example embodiment, to mechanisms for dynamically generating a channel for display of non-time bound content in a time bound grid.

BACKGROUND

Currently, an electronic program guide (EPG) only shows linear television programming based on a grid of time. There is no way to browse a streaming service catalog or recorded catalog of content using a time bound EPG.

BRIEF DESCRIPTION OF DRAWINGS

Various ones of the appended drawings merely illustrate example embodiments of the present invention and cannot be considered as limiting its scope.

FIG. 3A-FIG. 3E are sample user interfaces illustrating various examples of displaying non-time bound content in the EPG.

DETAILED DESCRIPTION

Figure 1:
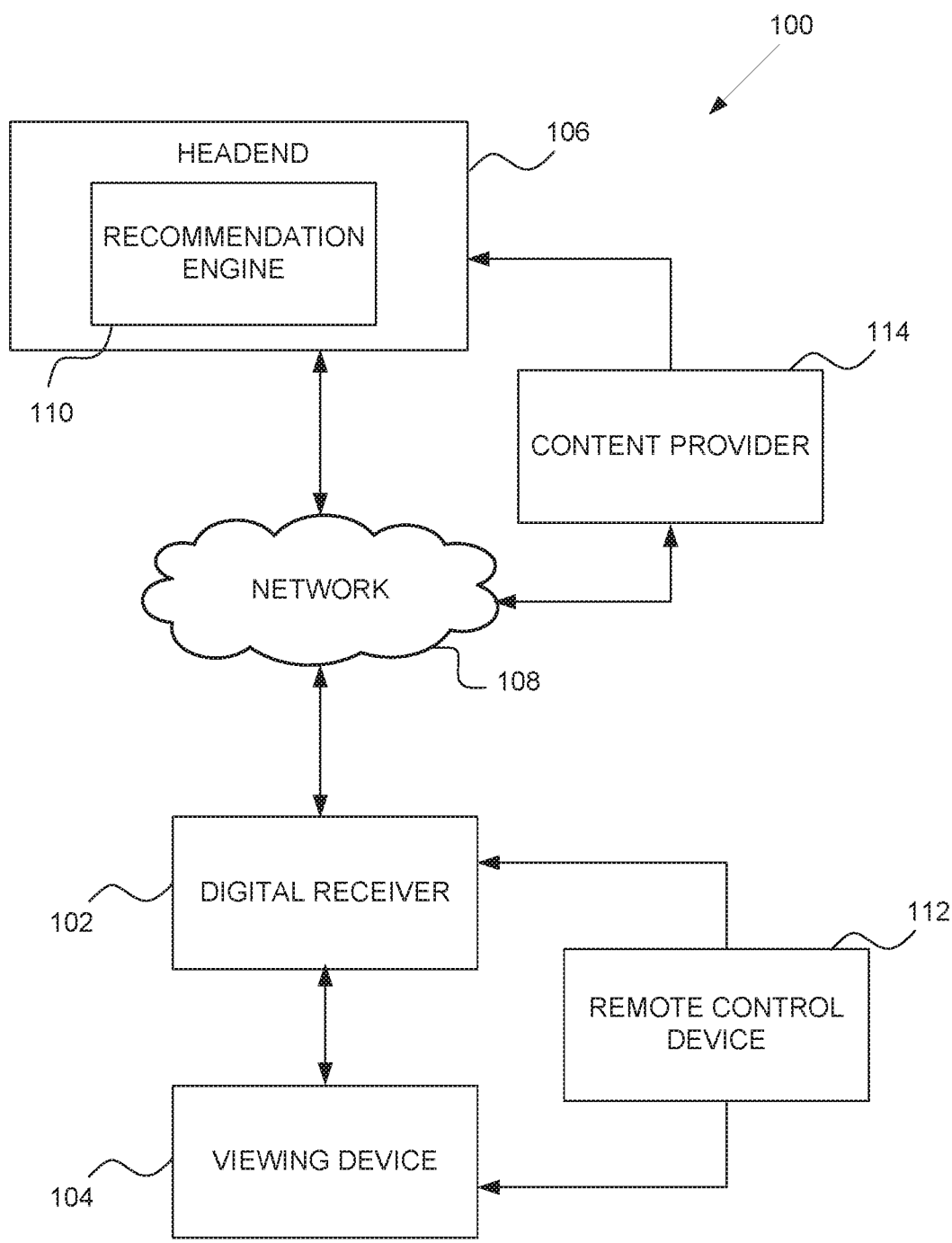
FIG. 1 is a diagram illustrating an example environment for displaying non-time bound content in an electronic program guide (EPG) in accordance with an example embodiment.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments described herein provide systems and methods for displaying non-time bound content in a time bound grid, such as an electronic program guide (EPG). The time bound grid displays a list of current and scheduled programs available on each channel at a specific time (e.g., at a specific date and hour). Many users are happy with traditional ways of interacting with a television—which is to use the EPG to discover content by browsing the EPG (e.g., time bound grid). Non-time bound content comprises content that is available to a user regardless of the time (e.g., video-on-demand (VOD) or recorded content). Conversely, time-bound content is content that is available (or available but recordable) at a specific time, such as broadcast, network television shows that are shown at specific dates and times. Example embodiments generate and append "channels" for non-time bound content to a traditional time bound grid or EPG. This improved EPG provides a way to introduce the users to available services that the users may not have known about, such as an on-demand catalog or to provide access to non-time bound content that the user has previously shown interested in (e.g., watched similar genre or types of programs, content recorded by the user, content on a user's watchlist) on a time bound user interface. In some embodiments, these non-time bound content channels display content objects representing the non-time bound content in a linear time bound format of a traditional time bound grid, and may be associated with third party services that are over-the-top (OTT) or video-on-demand (VOD) providers (e.g., Netflix, Hulu, Amazon Prime, YouTube) or recorded content (e.g., from a personal video recorder (PVR)). In alternative embodiments, the non-time bound content channel comprises a column displayed on a side of the time bound grid that scrolls in a vertical direction. In both the linear and vertical embodiments, the non-time bound content channel may scroll independently of the time bound content channels (e.g., may scroll faster or slower than viewer directed scrolling, or continue scrolling while the viewer is not scrolling).

In some embodiments, selection of a content object (e.g., representation of a program or piece of content displayed on the EPG) on a non-time bound content channel results in display (e.g., playback) of the program or piece of content without any further user interaction. In other embodiments, selection of the content object on the non-time bound content channel causes display of a detailed content view (e.g., media view) for the selected program (e.g., a page providing details of, or associated with, content corresponding to the selected content object).

As a result, one or more of the methodologies described herein facilitate solving the technical problem of generating user interfaces containing EPGs that include both time bound and non-time bound content displayed on a time bound grid and providing access to non-time bound content from a time-bound user interface. The methodologies include receiving content data (e.g., recommendations to be displayed in the non-time bound content channel). The logic also dynamically generates a user interface (e.g., EPG) whereby one or more channels on each scrollable "page" of the user interface may be non-time bound content channels that display content objects as if the corresponding content/programs are available at a particular time even though they are playable at any time. By using embodiments of the present invention, a user can easily and more quickly discover and navigate to desired programming information on the user interface. Accordingly, one or more of the methodologies discussed herein may obviate a need for extended search and navigation of the EPG, which may have the technical effect of reducing computing resources used by one or more devices within the system. Examples of such computing resources include, without limitation, processor cycles, network traffic, memory usage, storage space, and power consumption.

With reference to FIG. 1, an embodiment of an example environment 100 that enables display of non-time bound content on an electronic programming guide (EPG) is shown. In example embodiments, a digital receiver 102 of a user provides access to digital content. In one embodiment, the digital receiver 102 is a set-top box. The digital receiver 102 is coupled to a viewing device 104 (e.g., a television or monitor) on which the user can view the digital content. In some embodiments, the digital receiver 102 may be combined with the viewing device 104 (e.g., a smart television).

Since the user accesses the digital content through the digital receiver 102, the digital receiver 102 is configured to receive commands with respect to the digital content and the EPG. In example embodiments, the commands include instructions to scroll through the EPG and selection of a content object (e.g., representation of a program or piece of content displayed on the EPG). The instructions cause the digital receiver 102 to, in accordance with one embodiment, update the EPG based on the commands. Accordingly, in one embodiment, a mechanism on a remote control device 112 is activated and sends a signal to the digital receiver 102 to control viewing of, and interaction with, the EPG. In example embodiments, the digital receiver 102 comprises logic to generate the EPG and dynamically update the EPG based on the commands.

In some embodiments, a headend 106 processes device data received from the digital receiver 102 and provides recommendations, over a network 108 to the digital receiver 102, to be used in generating the EPG. In particular, a recommendation engine 110 receives user behavior information (also referred to as "device data") from the digital receiver 102 that indicates user interactions with various content (e.g., live content, video on demand (VOD), third party streamed content). The device data may indicate watching habits of the user including programs the user has viewed or recorded, ratings that the user has provided, viewing preferences (e.g., genres, actors), or any other information that indicates user interaction with content at the digital receiver 102. The recommendation engine 110 also accesses or receives data from one or more content providers 114 that may include recommendations provided by the content provider 114 or a catalog of content available from the content provider 114. The recommendation engine 110 then selects a number of pieces of content or programs (e.g., ten programs) to recommend to a user. For example, the recommendation engine 110 may weigh various content in the catalog based on a preferred genre determined from the device data received from the digital receiver 102 to select the content (e.g., programs) to be recommended and displayed in the EPG.

In some embodiments, the recommendation engine 110 may add to or remove from content recommended by the content provider 114. For example, if the content provider 114 provides a list often programs (e.g., movies, television shows) they want recommended to users, the recommendation engine 110, based on the device data, may determine that the user has no interest in one of the programs. For example, the user may have already viewed the program or has indicated (e.g., through a rating system) that they are not interested in that program. As a result, the recommendation engine 110 removes or replaces the program from the list of recommendations before transmitting content data (e.g., data regarding recommendations to be displayed) over the network 108 to the digital receiver 102. While example embodiments show the recommendation engine 110 being at the headend 106, alternative embodiments may provide the operations of the recommendation engine 110 at the receiver device 102.

One or more portions of the network 108 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. Any one or more portions of the network 108 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the content provider 114 comprises a third party service (e.g., Netflix, Hulu, YouTube, Amazon) that stores and provides the over-the-top (OTT) content or video-on-demand (VOD) content to the headend 106 or the digital receiver 102 via the network 108. The content comprises audio/video content (e.g., movies, television shows). In some embodiments, the content provider 114 provides the recommendations of the non-time bound content to be displayed on the EPG. For example, the content provider 114 may determine which programs they want recommended (e.g., displayed on the EPG) based on user behavior of the user or device data corresponding to the user (e.g., programs previously viewed from the content provider 114 by the user). This can occur after direct authentication of an individual user account that is logged in on the content provider application running in background on the digital receiver 102 or based on stored authentication data. Alternatively, the content provider 114 can have a subset of programs they want recommended on the EPG regardless of the specific user, or a subset of programs based on a region the user is located. In some embodiments, the content data to be displayed may be accessed via an application program interface (API) of the content provider 114 by the digital receiver 102. Alternatively, the content provider 114 can push the content data to the digital receiver 102. In other embodiments, the content data may be accessed via an API by the headend 106 or transmitted by the content provider 114 to the headend 106, which subsequently transmits the content data to the digital receiver 102 after processing by the recommendation engine 110.

It is noted that the environment 100 shown in FIG. 1 is merely an example. For instance, while only one content provider 114 is shown, any number of content providers may be embodied within the environment 100. Additionally, some components of the environment 100 may be combined. For example, the digital receiver 102 may be embodied within the viewing device 104 to form a single device (e.g., a smart television). Furthermore, operations discussed as occurring at the digital receiver 102 may be performed at the headend 106 or vice-versa.

Any of the systems or machines (e.g., databases, devices, servers) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 5, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines. Moreover, any two or more of the systems or machines illustrated in FIG. 1 may be combined into a single system or machine, and the functions described herein for any single system or machine may be subdivided among multiple systems or machines.

Figure 2:
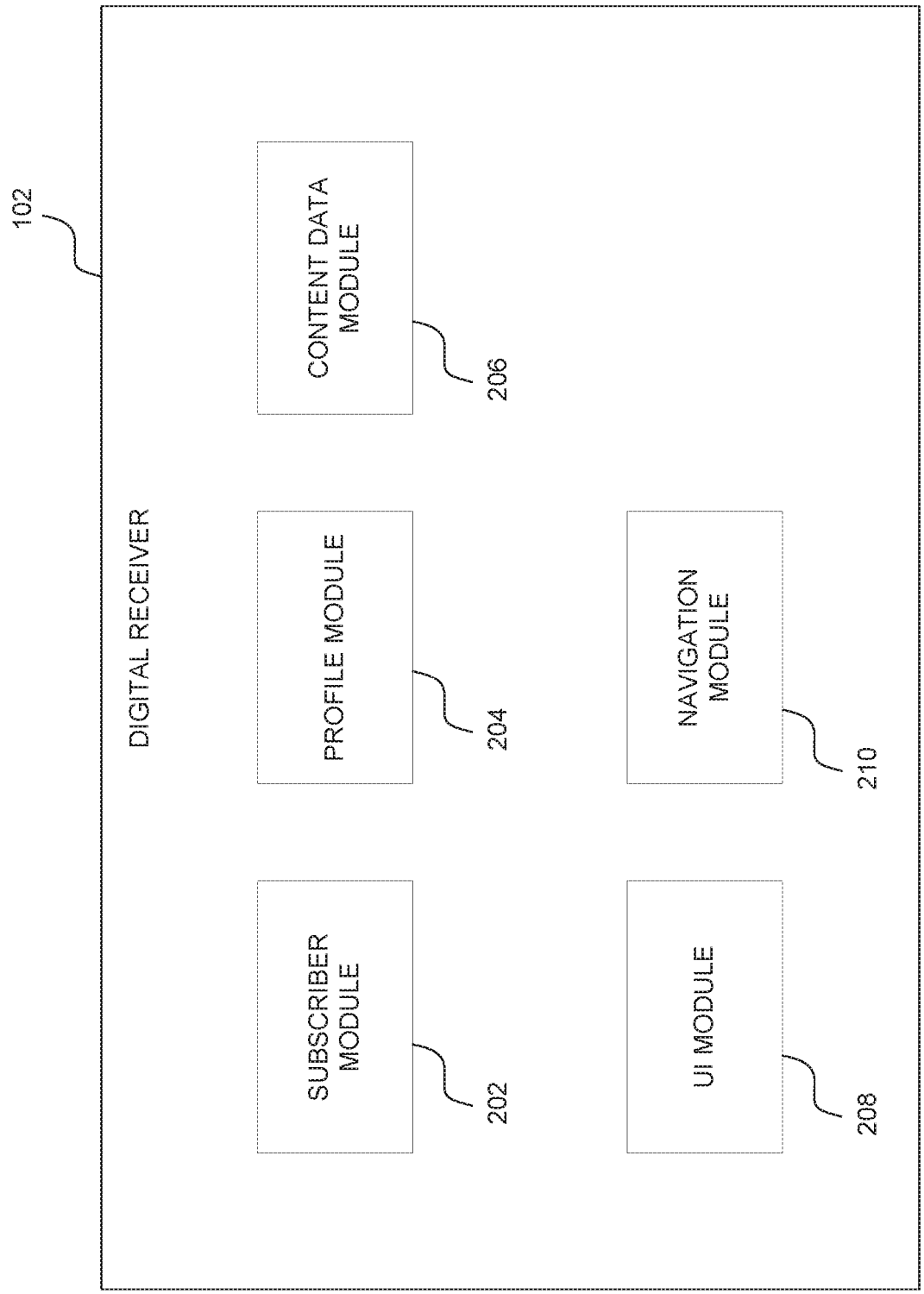
FIG. 2 is a block diagram illustrating an example embodiment of components within a digital receiver in accordance with an example embodiment.

FIG. 2 is a block diagram illustrating an example embodiment of the digital receiver 102. In example embodiments, the digital receiver 102 generates and displays user interfaces comprising EPGs that provide rows of channels, whereby each row may represent, for example, a broadcast channel, a network channel, a third party service channel (e.g., of the content provider 114), PVR channel, or a VOD channel. Each channel comprises one or more content objects that each represent a piece of content or program (e.g., episode of a show, movie, video). To enable these operations, the digital receiver 102 comprises a subscriber module 202, a profile module 204, a content data module 206, a user interface (UI) module 208, and a navigation module 210 all of which may be configured to communicate with each other (e.g., over a bus, shared memory, or a switch).

Any one or more of the components (e.g., modules) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. For example, some of the components may be embodied within the digital receiver 102 while others are embodied within the headend 106. The digital receiver 102 may comprise other components not pertinent to example embodiments that are not shown or discussed.

The subscriber module 202 manages third party applications (e.g., Netflix application, Hulu application) that the user subscribes to, and which may be accessed via the digital receiver 102. Each of third party application typically has a login. Some of the third party applications may have shipped with the digital receiver 102 while others are downloaded and installed by the user. In some cases, the subscriber module 202 knows the user is a subscriber based on a successful authentication with a user ID and login. The successful authentication may be based on a federated identifier with which the digital receiver 102 facilitated the login, based on metadata received from the third party service for their application, or a signal received from the third party application that indicates authentication. Once the third party application is authenticated, the digital receiver 102 has access to the third party service content data (e.g., metadata and recommendations), via an API, which can be used to populate a line or channel in the EPG for that third party service. Alternatively, the third party service may push the content data to the digital receiver 102.

The profile module 204 manages the device data that indicates user behavior (e.g., actions performed by the user) at the digital receiver 102. For example, the device data may indicate programs the user has viewed or recorded, ratings that the user has provided, viewing preferences (e.g., genres, actors), or any other information that indicates user interaction with content at the digital receiver 102. In embodiments where the recommendation engine 110 at the headend 106 is used to generate the content data, the profile module 204 pushes the device data to the recommendation engine 110 via the network 108. The recommendation engine 110 uses the device data to determine recommendations to be presented in the EPG, and returns the recommendations, for example, in the content data.

The content data module 206 receives the content data that is used to generate the EPG at the digital receiver 102. The content data includes, for example, recommendations or metadata received from the recommendation engine 110 or recommendations received directly from the third party services such as the content providers 114 (e.g., via an API). In particular, the content data may include a name of each piece of recommended content and details about the recommended content (e.g., season, episode, duration, rating, summary of content).

The user interface (UI) module 208 generates the user interface(s) displaying the EPG. In example embodiments, the user interface module 208 generates, using the content data, a non-time bound content channel and dynamically inserts the non-time bound content lines or channels into the EPG. Because the content data includes duration for each recommended content, the user interface module 208 can determine a duration to space recommended content apart on the non-time bound content channel. As a result, non-linear (e.g., non-time bound) content (e.g., VOD, recorded content) is displayed for easy discovery in a linear time-based grid. Examples illustrating non-time bound content lines or channels are shown and described in FIG. 3A and FIG. 3B.

A navigation module 210 receives user inputs and causes an appropriate update to the user interface. In some cases, the user input is a navigation of the EPG (e.g., a scrolling input that indicates a direction, for example, left, right, up, down to change a portion of the EPG that is displayed). For instance, a scroll to the left moves the rows of content objects of the displayed channels to the left, which enables presentation of content objects that are further in time in the future. Similarly, a scroll up moves the rows of content objects up to display further channels (e.g., on a next scroll "page"). Each user input is received by the navigation module 210 and sent to the user interface module 208 to cause an update to the user interface.

Furthermore, the navigation module 202 may receive a selection of a content object that either triggers automatic playing of the corresponding program or links the digital receiver 102 to a detailed content view (e.g., media view) for the program corresponding to the selected content object. In some embodiments, selecting a particular content object cross-launches the third party service application (e.g., Netflix; Hulu) or the digital receiver application (e.g., for record VODs), and begins playback of the corresponding program in full screen. For example, selecting a "House of Cards" content object triggers launch of the Netflix application and, based on a deep link to the content/program, automatically causes immediate playback of the selected episode of "House of Cards." In embodiments where a deep link is not available, selection of the content object causes the digital receiver 102 to access and display a details content view (e.g., media view) for the selected content/program (e.g., an overview page for "House of Cards").

Figure 3D:
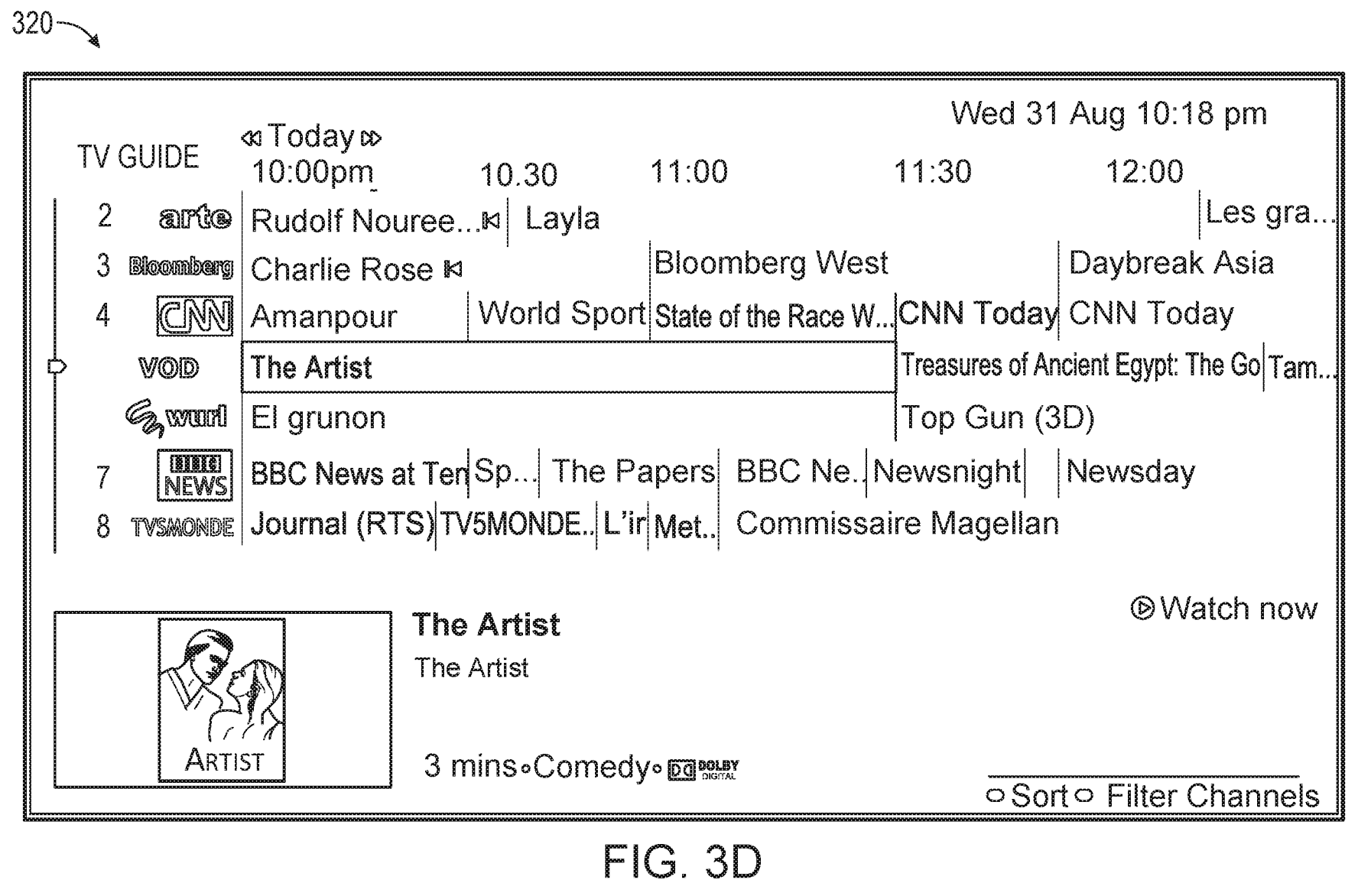

FIGS. 3A-3E are sample user interfaces illustrating various examples of displaying non-time bound content on an EPG. Referring to FIG. 3A, an EPG user interface 300 (also referred to as "EPG") is shown. In example embodiments, the user interface module 208 generates and displays the EPG 300 having rows of channels. In example embodiments, one or more lines or channels on each "page" (e.g., viewable section) of the EPG may be used to display non-time bound content. For example, a first two channels on each "page" may be used to display OTT, VOD, or other non-time bound content. In the example of FIG. 3A, the channels shown include time bound content channels that the user views the most (e.g., ABC, ESPN, BBC, and AMC) along with two channels that are dynamically inserted non-time bound content channels (e.g., VOD and Netflix). FIG. 3A shows six channels on a first "page." If the user scrolls up past channel 227, a next "page" comprising, for example, another two channels of non-time bound content objects (e.g., the same non-time bound content channels as the previous page or a different set of non-time bound content channels) along with four network channels may be shown. Any combination of non-time bound content channels and time bound content channels (e.g., network or broadcast channels) can be displayed on each "page" of the EPG. Additionally, while example embodiments discuss the non-time bound content channel being displayed prior to the time bound content channels, the non-time bound content channel can be displayed anywhere in the EPG (e.g., between time-bound content channels or at a bottom of the EPG "page").

As the user advances in time (e.g., scrolls left), the content in all the channels move. Because the non-time bound content represented by the content objects are not time-based, the content objects may be visually distinguished to indicate that even if the program appears to be showing in two hours from now (e.g., Interstellar at 10:00 PM), if the user selects that content object, the corresponding program will immediately play.

In some embodiments, if the user is watching channel 5 and hits a guide button, the EPG 300 starts on channel 5 (e.g., entry point into the EPG). In these embodiments, one or more non-time bound content channels are included before the entry point. As such, instead of the EPG starting with channel 5, the EPG 300 may show, for example, an OTT lineA channel and an OTT lineB channel, channel 5, channel 6, channel 7, and so forth.

In one embodiment, if the user exits the EPG 300 and returns, the EPG 300 reinserts the user at the current channel (e.g., entry point) with the same content objects in the same order for the non-time bound content channel. In an alternative embodiment, as time progresses, the content objects in the non-time bound content channel may shift. For example, if the user accesses the EPG two hours later, the non-time bound content channel may mimic the behavior of the rest of the grid (e.g., the time bound channels). As a result, the EPG may show a content object for a program that was previously shown two hours later on the EPG first, and the first content object from two hours ago is now moved to the end of the non-time bound content channel.

Referring to FIG. 3B, another example EPG user interface 310 is shown. The EPG 310 shows a "binge" channel for a particular program (e.g., Game of Thrones). The recommendation engine 110 or the content provider 114 (e.g., Netflix) may determine based on user behavior and watching habits (e.g., device data) that the user likes to view this program or this type of program (e.g., genre). Accordingly, content data is provided to the content data module 206 that recommends the particular program, which is used by the user interface module 208 to generate a channel containing content objects for multiple episodes of the particular program. In alternative embodiments, the channel may comprise different programs of the same genre (e.g., sci fi, romance, cooking). Further still, if the user has recorded content (e.g., using a personal video recorder—PVR), a recorded content channel can be included in the EPG as the non-time bound content channel. In yet another embodiment, the non-time bound content channel may display a single content object for a particular piece of content (e.g., a particular movie, a particular series). Essentially any type of channel that represents non-time bound content can be included in the EPG, whereby selection of a content object in the non-time bound content channel causes display of content associated with the content object (e.g., playback of the program, access to a detail view page for the program). Thus, the selection goes beyond just launching the third party service application, but takes the user to the actual content/program associated with the selection.

In some embodiments, a finite number of recommendations are included in the content data for the recommendation of non-time bound content. For example, the content data may include ten recommendations or enough recommendations to cover a predetermined period of time (e.g., six hours) on the EPG. In one embodiment, if the user scrolls to an end of the content objects for the non-time bound content channel in the EPG, the content objects are repeated. In alternative embodiments, if the user scrolls to the end of the content objects for the non-time bound content channel, a selection (e.g., button) is displayed that triggers display of more recommendations or other type of information. For example, in some cases, the selection launches the third party service application which may provide further recommendations, provide access to a catalog, or presents a list (e.g., watchlist) of the user. In other cases, the selection extends out the channel with further recommendations.

Referring now to FIG. 3C, another example EPG user interface 320 is shown. In the embodiment of FIG. 3C, non-time bound content channels (e.g., VOD and wurl) are incorporated into the time bound grid at the end of the page. The non-time bound content channels are locked into that position on the time bound grid such that if the user scrolls or pages through a channel list in the time bound grid, the non-time bound content channels move along with the time bound content channels as shown in FIG. 3D. That is, non-time bound content channels are dynamically placed in the time bound grid at a start of an EPG session, but during the session, the channels are static in their position in the time-bound grid. However, if the user selects a channel and dismisses the EPG 320 and later returns to the EPG 320, the non-time bound content channels are placed at the end of the first page again. It is further noted that while the non-time bound content channel has been discussed as being added to a beginning or end of a page, in alternative embodiments, the non-time bound content channel can be dynamically added anywhere in the time bound grid.

In the embodiments of FIG. 3A-3D, the non-time bound content channel may linearly scroll independently of the time bound content channels. For example, the non-time bound content channel may scroll faster or slower than viewer/user directed scrolling of one or more of the time bound content channels. In another example, the non-time bound content channel may scroll regardless of whether the user is scrolling or continue scrolling after a user stops scrolling one or more of the time bound content channels.

Referring now to FIG. 3E, a further example EPG user interface 330 is shown. In the embodiment of FIG. 3E, the non-time bound content channel 332 comprises a column or banner displayed on a side of the time bound grid. Thus, the non-time bound content channel 332 scrolls in a vertical direction. In example embodiments, the non-time bound content channel 332 may scroll independently of the time bound content channels (e.g., may scroll faster or slower than viewer directed scrolling, or continue scrolling while the viewer is not scrolling).

In some embodiments, the non-time bound content channel may show a promotion for a piece of content and for signing up if the user of the EPG is not a subscriber. For example, the non-time bound channel can display a content object of "Amazon, subscribe now, Downtown Abbey, season 3." Selection of the content object may take the user to a subscription page and access to the piece of content upon completion of the subscription page. In other embodiments, if the user is not a subscriber to a particular third party service (e.g., OTT service), non-time bound content channels for these third party services are not shown. For example, the subscriber module 202 determines the third party services that the user of the digital receiver 102 are subscribed to. As a result, the user interface module 208, in these embodiments, only generates an EPG having non-time bound content channels for the third party services that the user is a subscriber.

Several trigger events may exist for a channel to appear: (1) the channel appears by default; (2) the user installs an application—even if the user has never launched it; (3) the user has launched an application; and/or (4) the headend 106 or the digital receiver 102 knows the user has authenticated a user account with a service related to that application (e.g., the user has logged into NetFlix). In this instance, the log-in event may give the headend 106 or the digital receiver 102 permission to user specific data and can change a representation of the metadata within the UI by giving user specific content recommendations/metadata. In other instances, the user launch of the application or user account authentication can be used as a trigger event for changing the representation in the UI from a generic promotional banner (e.g., "launch hulu") to the time bound representation of individual content objects. With multiple available services (e.g., third party services), visibility and placement or prominence in the UI may be determined by the authentication state (e.g., not installed (click launches install flow), installed but never launched, installed and launched but used in 'free' mode, installed and logged in). Data pertaining to the state may influence recommendations in other areas of the UI as well.

Figure 4:
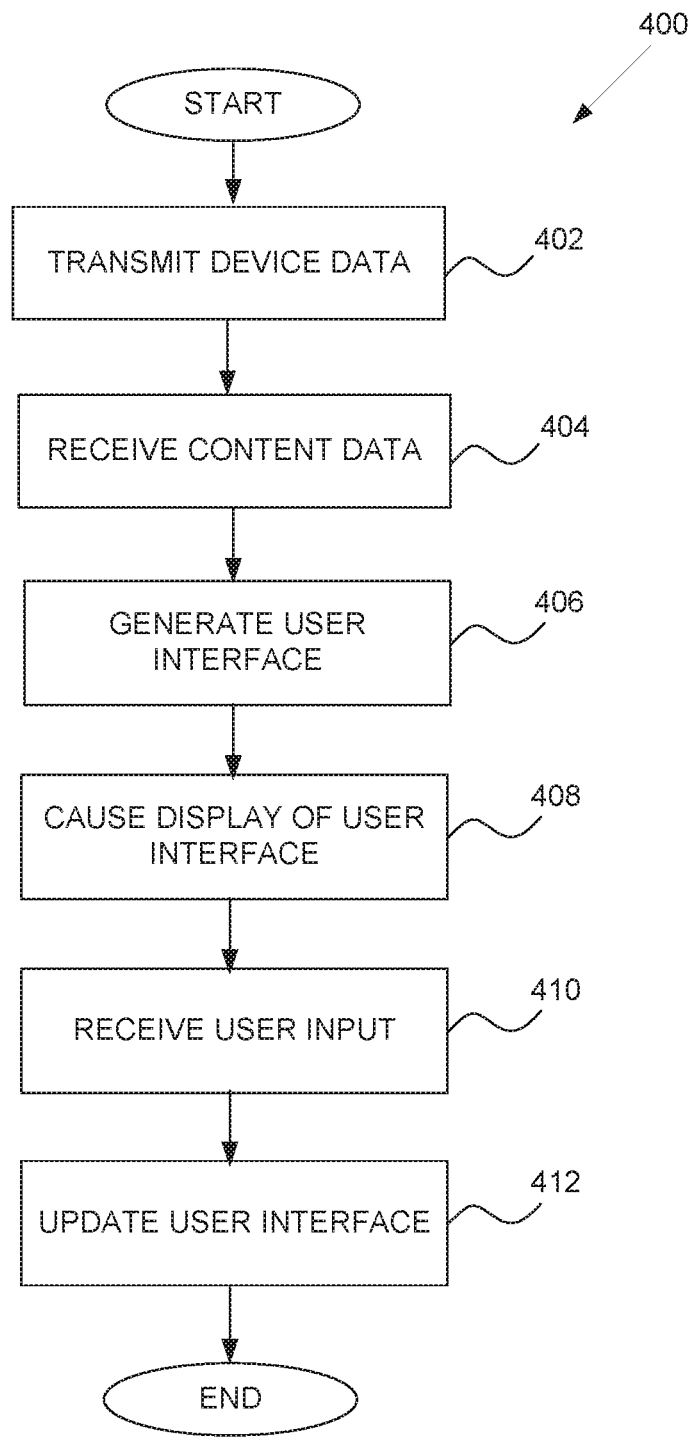
FIG. 4 is a flow diagram of an example method for displaying non-time bound content in the EPG in accordance with an example embodiment.

FIG. 4 is a flow diagram of an example method 400 for displaying non-time bound content in an EPG. In example embodiments, the method 400 is performed in part or in whole by components of the digital receiver 102. Accordingly, the method 400 is described by way of example with reference to the digital receiver 102. However, it shall be appreciated that at least some of the operations of the method 400 may be deployed on various other hardware configurations or be performed by similar components residing elsewhere in the environment 100. Therefore, the method 400 is not intended to be limited to the digital receiver 102.

In operation 402, the profile module 204 transmits device data (associated with a profile of the user) to the headend 106. In some embodiments, the headend 106 processes the device data received from the digital receiver 102 to determine recommendations of non-time bound program or content for the user of the digital receiver 102. Using, the device data that indicates user behavior and preferences of the user and data received or obtained from one or more content providers 114 (e.g., recommendations provided by the content provider 114 or a catalog of content available from the content provider 114), the recommendation engine 110 selects the content (e.g., programs) to be recommended and displayed in the non-time bound content channels of the EPG. Alternatively, the recommendation engine 110 may add to or remove from content recommended by the content provider 114. In embodiments where the content provider 114 provides the content data directly to the digital receiver 102, operation 402 is optional or not needed.

In operation 404, the digital receiver 102 receives the content data that represents the recommendations for non-time bound content that should be displayed in a non-time bound content channel. In example embodiments, the content data module 206 receives the content data that is used to generate the EPG at the digital receiver 102. The content data includes, for example, recommendations or metadata received from the recommendation engine 110 or recommendations received directly from the third party services such as the content providers 114 (e.g., via an API). The content data may include a name of each piece of content and details about the content (e.g., season, episode, duration, rating, summary of content).

In operation 406, the user interface module 208 generates the user interface displaying the EPG. In example embodiments, the user interface module 208 generates the non-time bound content channel and dynamically inserts the non-time bound content channels into the EPG. As a result, non-linear (e.g., non-time bound) content (e.g., VOD, recorded content) is displayed for easy discovery in a linear time bound format or grid. The user interface module 208 then causes display of the user interface in operation 408. For example, the user interface module 208 causes the viewing device 104 to display the generated EPG.

In operation 410, a user input is received by the navigation module 210. In some embodiments, the user input comprises a navigation of the EPG (e.g., a scrolling input that indicates a direction to change a portion of the EPG that is displayed). In other embodiments, the user input comprises a selection of a content object in the non-time bound content channel that either triggers automatic playing of the corresponding program or links the digital receiver 102 to a detailed content view (e.g., media view) for the program corresponding to the selected content object.

In operation 412, the user interface is updated by the user interface module 208. For example, the selection of a particular content object from the non-time bound content channel cross-launches a third party service application (e.g., Netflix; Hulu) or the digital receiver application (e.g., for record VODs), and begins playback of the corresponding program in full screen. In embodiments where a deep link to launch playing of the program is not available, selection of the content object causes the digital receiver 102 to access and display a details content view (e.g., media view or overview page) for the selected content/program.

In embodiments where the user input in operation 410 is a navigation of the EPG (e.g., a scrolling input that indicates a direction to change a portion of the EPG that is displayed), the user interface module 208 updates a view of the EPG. For instance, a scroll to the left moves the rows of content objects of the displayed channels to the left, which enables presentation of content objects that are further in time in the future. As the user advances in time (e.g., scrolls left), the content in all the channels move. Similarly, a scroll up moves the rows of content objects up to display further channels (e.g., on a next scroll "page"). Because the non-time bound content represented by the content objects are not time-based, the content objects may be visually distinguished to indicate that even if the program appears to be showing in two hours from now, if the user selects that content object, the corresponding program will immediately play.

Figure 5:
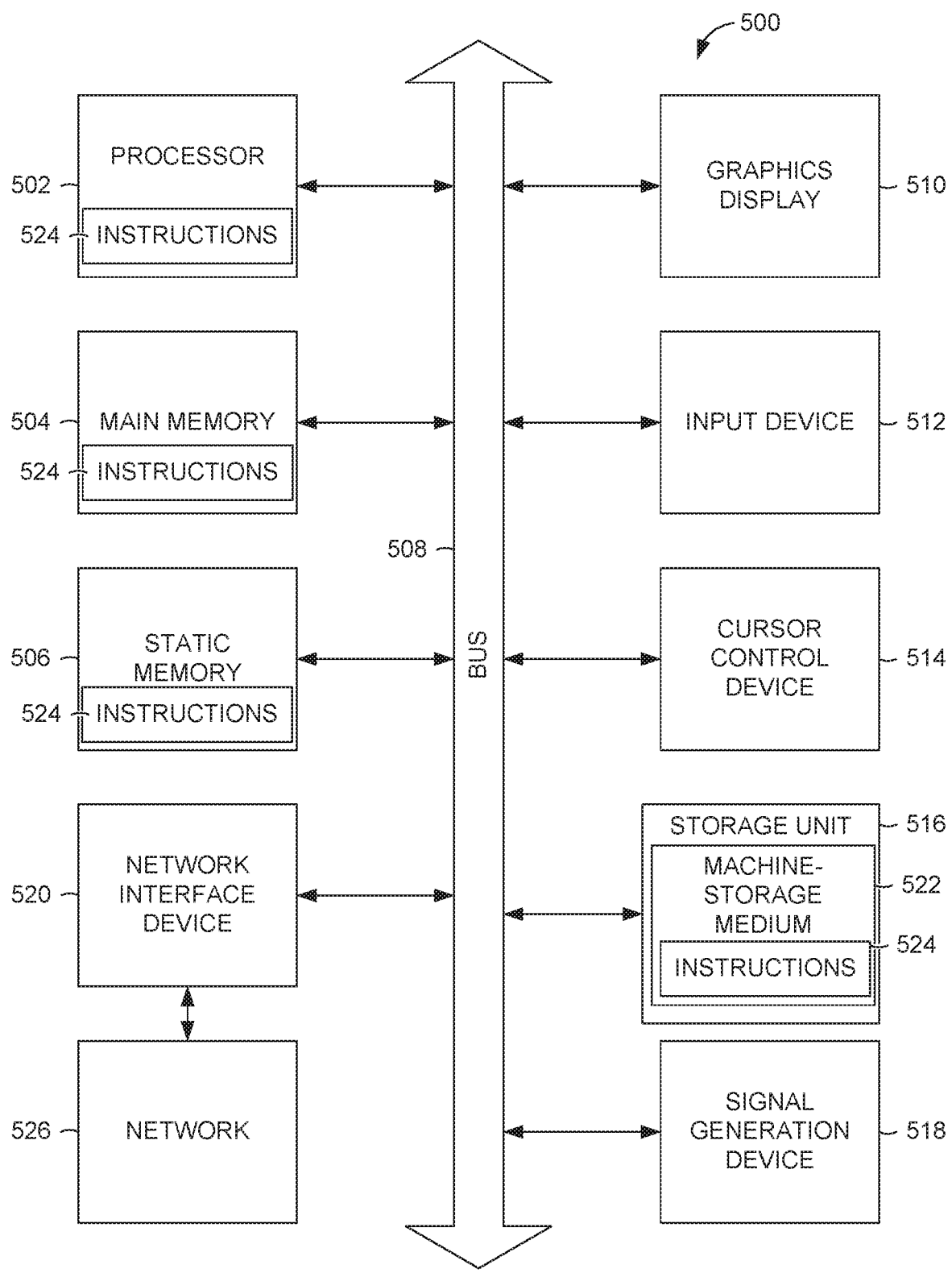
FIG. 5 is a diagrammatic representation of a machine in an example form of a computing system within which a set of instructions may be executed for causing the machine to perform any one or more of the methodologies discussed herein, according to an example embodiment.

FIG. 5 is a block diagram illustrating components of a machine 500, according to some example embodiments, able to read instructions 524 from a machine-storage medium 522 (e.g., a non-transitory machine-readable medium, a machine-readable storage medium, a computer-readable storage medium, or any suitable combination thereof) and perform any one or more of the methodologies discussed herein, in whole or in part. Specifically, FIG. 5 shows the machine 500 in the example form of a computer device (e.g., a computer) within which the instructions 524 (e.g., software, a program, an application, an applet, an app, or other executable code) for causing the machine 500 to perform any one or more of the methodologies discussed herein may be executed, in whole or in part.

For example, the instructions 524 may cause the machine 500 to execute the flow diagram of FIG. 4. The instructions 524 can transform the general, non-programmed machine 500 into a particular machine (e.g., specially configured machine) programmed to carry out the described and illustrated functions in the manner described.

In alternative embodiments, the machine 500 operates as a standalone device or may be connected (e.g., networked) to other machines. The machine 500 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 500 capable of executing the instructions 524, sequentially or otherwise, that specify actions to be taken by that machine 500. Further, while only a single machine 500 is illustrated, the term "machine" shall also be taken to include a collection of machines that individually or jointly execute the instructions 524 to perform any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The processor 502 may contain microcircuits that are configurable, temporarily or permanently, by some or all of the instructions 524 such that the processor 502 is configurable to perform any one or more of the methodologies described herein, in whole or in part. For example, a set of one or more microcircuits of the processor 502 may be configurable to execute one or more modules (e.g., software modules) described herein.

The machine 500 may further include a graphics display 510 (e.g., a plasma display panel (PDP), a light emitting diode (LED) display, a liquid crystal display (LCD), a projector, a cathode ray tube (CRT), or any other display capable of displaying graphics or video). The machine 500 may also include an input device 512 (e.g., a keyboard or keypad), a cursor control device 514 (e.g., a mouse, a touchpad, a trackball, a joystick, a motion sensor, an eye tracking device, or other pointing instrument), a storage unit 516, a signal generation device 518 (e.g., a sound card, an amplifier, a speaker, a headphone jack, or any suitable combination thereof), and a network interface device 520.

The storage unit 516 includes the machine-storage medium 522 (e.g., a tangible machine-readable storage medium) on which are stored the instructions 524 embodying any one or more of the methodologies or functions described herein. The instructions 524 may also reside, completely or at least partially, within the main memory 504, within the processor 502 (e.g., within the processor's cache memory), or both, before or during execution thereof by the machine 500. Accordingly, the main memory 504 and the processor 502 may be considered machine-storage media 522 (e.g., tangible and non-transitory machine-readable storage media).

In some example embodiments, the machine 500 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 504, 506, and/or memory of the processor(s) 502) and/or storage unit 516 may store one or more sets of instructions and data structures (e.g., software) 524 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 522") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 522 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 522 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 524 may further be transmitted or received over a communications network 526 using a transmission medium via the network interface device 520 and utilizing any one of a number of well-known transfer protocols (e.g., HTTP). Examples of communication networks 526 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 524 for execution by the machine 500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium 522 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 502 or a group of processors 502) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Examples

Example 1 is a method for generating and displaying a non-time bound content channel in a time-bound grid. The method comprises receiving content data representing non-time bound content to be displayed in a time bound grid; generating, using a hardware processor, the time bound grid, the generating the time bound grid comprising: creating, based on the content data, a non-time bound content channel, the non-time bound content channel displaying one or more content objects representing the non-time bound content in the time bound grid, and incorporating the non-time bound content channel with a plurality of time bound channels in the time bound grid; and causing display of the generated time bound grid on a viewing device of a user.

In example 2, the subject matter of example 1 can optionally include wherein the time bound grid comprises an electronic program guide (EPG).

In example 3, the subject matter of examples 1-2 can optionally include wherein the non-time bound content channel is represented in a linear time bound format that scrolls independently of the plurality of time bound content channels.

In example 4, the subject matter of examples 1-3 can optionally include visually distinguishing the content objects representing the non-time bound content to indicate that user selection of one of the content objects representing the non-time bound content will immediately play.

In example 5, the subject matter of examples 1-4 can optionally include wherein the non-time bound content channel comprises a column displayed on a side of the time bound grid that scrolls in a vertical direction.

In example 6, the subject matter of examples 1-5 can optionally include wherein the content data representing the non-time bound content comprises a finite number of non-time bound content; and scrolling to an end of the non-time bound content channel comprising the finite number of non-time bound content causes the content objects representing the non-time bound content to repeat.

In example 7, the subject matter of examples 1-6 can optionally include wherein the content data representing the non-time bound content comprises a finite number of non-time bound content; and the method further comprises providing a selection that triggers obtaining and displaying more non-time bound content in response to the user scrolling to an end of the non-time bound content channel comprising the finite number of non-time bound content.

In example 8, the subject matter of examples 1-7 can optionally include wherein the non-time bound content channel displays a content object promoting a piece of content and requesting a non-subscriber to subscribe.

In example 9, the subject matter of examples 1-8 can optionally include wherein the content data comprises recommendations of non-time bound content, the recommendations determined to be of interest to the user based on device data corresponding to the user, the device data indicating user behavior and watching habits of the user.

Example 10 is a system for generating and displaying a non-time bound content channel in a time-bound grid. The system includes one or more processors and a memory storing instructions that, when executed by the one or more hardware processors, causes the one or more hardware processors to perform operations comprising receiving content data representing non-time bound content to be displayed in a time bound grid; generating the time bound grid, the generating the time bound grid comprising creating, based on the content data, a non-time bound content channel, the non-time bound content channel displaying one or more content objects representing the non-time bound content in the time bound grid, and incorporating the non-time bound content channel with a plurality of time bound channels in the time bound grid; and causing display of the generated time bound grid on a viewing device of a user.

In example 11, the subject matter of example 10 can optionally include wherein the time bound grid comprises an electronic program guide (EPG).

In example 12, the subject matter of examples 10-11 can optionally include wherein the non-time bound content channel is represented in a linear time bound format that scrolls independently of the plurality of time bound content channels.

In example 13, the subject matter of examples 10-12 can optionally include wherein the operations further comprise visually distinguishing the content objects representing the non-time bound content to indicate that user selection of one of the content objects representing the non-time bound content will immediately play.

In example 14, the subject matter of examples 10-13 can optionally include wherein the non-time bound content channel comprises a column displayed on a side of the time bound grid that scrolls in a vertical direction.

In example 15, the subject matter of examples 10-14 can optionally include wherein the content data representing the non-time bound content comprises a finite number of non-time bound content; and scrolling to an end of the non-time bound content channel comprising the finite number of non-time bound content causes the content objects representing the non-time bound content to repeat.

In example 16, the subject matter of examples 10-15 can optionally include wherein the content data representing the non-time bound content comprises a finite number of non-time bound content; and the operations further comprise providing a selection that triggers obtaining and displaying more non-time bound content in response to the user scrolling to an end of the non-time bound content channel comprising the finite number of non-time bound content.

In example 17, the subject matter of examples 10-16 can optionally include wherein the non-time bound content channel displays a content object promoting a piece of content and requesting a non-subscriber to subscribe.

In example 18, the subject matter of examples 10-17 can optionally include wherein the content data comprises recommendations of non-time bound content, the recommendations determined to be of interest to the user based on device data corresponding to the user, the device data indicating user behavior and watching habits of the user.

Example 19 is a machine-storage medium for generating and displaying a non-time bound content channel in a time-bound grid. The machine-storage medium configures one or more processors to perform operations comprising receiving content data representing non-time bound content to be displayed in a time bound grid; generating the time bound grid, the generating the time bound grid comprising creating, based on the content data, a non-time bound content channel, the non-time bound content channel displaying one or more content objects representing the non-time bound content in the time bound grid, and incorporating the non-time bound content channel with a plurality of time bound channels in the time bound grid; and causing display of the generated time bound grid on a viewing device of a user.

In example 20, the subject matter of example 19 can optionally include wherein the content data comprises recommendations of non-time bound content, the recommendations determined to be of interest to the user based on device data corresponding to the user, the device data indicating user behavior and watching habits of the user.

Although an overview of the inventive subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:
1. A method comprising:
identifying, by a hardware processor, non-time bound content, the identifying including:
receiving a list of recommended content from a content provider; and
based on device data, from a receiver device, that is used to determine user interest, selecting one or more recommended content from the list to include in the non-time bound content;
causing display of one or more content objects representing the non-time bound content on a viewing device of a user;
receiving a selection of a first content object from the one or more content objects;
responsive to receiving the selection of the first content object, determining whether the selection comprises a deep link associated with the first content object, the deep link providing a trigger to launch, at the receiver device of the user, a third-party service application associated with the first content object and to begin playback of an episode of the first content object associated with the deep link;
based on the selection comprising the deep link, causing the third-party service application to launch on the receiver device of the user and automatically begin the playback of the episode of the first content object; and based on the selection not comprising the deep link, causing display of a detailed content view that provides an overview of the first content object.

2. The method of claim 1, wherein the display of the one or more content objects comprises a binge channel, the method further comprising:
based on user behavior and watching habits, determining a user affinity for a particular program; and
generating the binge channel for the particular program based on the user affinity, the one or more content objects each representing a different episode of the particular program in the binge channel.

3. The method of claim 1, wherein the display of the one or more content objects comprises a binge channel, the method further comprising:
based on user behavior and watching habits, determining a user affinity for a particular genre; and
generating the binge channel for the particular genre based on the user affinity, the one or more content objects each representing a different program of the particular genre in the binge channel.

4. The method of claim 1, wherein the display of the one or more content objects comprises a non-time bound channel in a time bound grid, each of the one or more content objects displayed on the time bound grid corresponding to a time on the time bound grid.

5. The method of claim 4, further comprising:
detecting access of the time bound grid an amount of time after the causing display of the one or more content objects representing the non-time bound content on the time bound grid; and
in response to the detecting, updating the time bound grid by the amount of time.

6. The method of claim 5, wherein the updating the time bound grid comprises:
shifting the one or more content objects representing the non-time bound content by the amount of time on the time bound grid to match a same shift by the amount of time in time bound channels of the time bound grid; and
moving a content object of the one or more content objects corresponding to a time previously displayed on the time bound grid to an end of the non-time bound channel.

7. The method of claim 4, wherein:
the time bound grid comprises a plurality of time bound channels; and
the non-time bound channel scrolls independently of the plurality of time bound channels.

8. The method of claim 1, further comprising visually distinguishing the one or more content objects representing the non-time bound content to indicate that selection of one of the one or more content objects will automatically begin playback of the corresponding non-time bound content.

9. The method of claim 1, wherein the display of the one or more content objects representing the non-time bound content comprises a column displayed on a side of a time bound grid having a plurality of time bound channels.

10. The method of claim 9, wherein the non-time bound content scrolls independently of the plurality of time bound channels.

11. The method of claim 1, wherein a second content object of the one or more content objects comprises a promotion for a piece of non-time bound content, selection of the second content object causing the user to be redirected to a subscription page to subscribed in order to view the piece of non-time bound content.

12. The method of claim 1, wherein the identifying further comprises:
based on the device data used to determine user interest, replacing one or more recommended content on the list with other content; and
including the other content in the non-time bound content.

13. A system comprising:
one or more hardware processors; and
a memory storing instructions, that when executed by the one or more hardware processors, cause the one or more hardware processors to perform operations comprising:
identifying non-time bound content, the identifying including:
receiving a list of recommended content from a content provider; and
based on device data, from a receiver device, that is used to determine user interest, selecting one or more recommended content from the list to include in the non-time bound content;
causing display of one or more content objects representing the non-time bound content on a viewing device of a user;
receiving a selection of a first content object from the one or more content objects;
responsive to receiving the selection of the first content object, determining whether the selection comprises a deep link associated with the first content object, the deep link providing a trigger to launch, at the receiver device of the user, a third-party service application associated with the first content object and to begin playback of an episode of the first content object associated with the deep link;
based on the selection comprising the deep link, causing the third-party service application to launch on the receiver device of the user and automatically begin the playback of the episode of the first content object; and
based on the selection not comprising the deep link, causing display of a detailed content view that provides an overview of the first content object.

14. The system of claim 13, wherein the display of the one or more content objects comprises a binge channel, the operations further comprising:
based on user behavior and watching habits, determining a user affinity for a particular program; and
generating the binge channel for the particular program based on the user affinity, the one or more content objects each representing a different episode of the particular program in the binge channel.

15. The system of claim 13, wherein the display of the one or more content objects comprises a binge channel, the operations further comprising:
based on user behavior and watching habits, determining a user affinity for a particular genre; and
generating the binge channel for the particular genre based on the user affinity, the one or more content objects each representing a different program of the particular genre in the binge channel.

16. The system of claim 13, wherein the display of the one or more content objects comprises a non-time bound channel in a time bound grid, each of the one or more content objects displayed on the time bound grid corresponding to a time on the time bound grid.

17. The system of claim 16, wherein:
the time bound grid comprises a plurality of time bound channels; and the non-time bound channel scrolls independently of the plurality of time bound channels.

18. The system of claim 13, wherein the display of the one or more content objects representing the non-time bound content comprises a column displayed on a side of a time bound grid having a plurality of time bound channels.

19. A machine-storage medium storing instructions that when executed by one or more hardware processors of a machine, cause the machine to perform operations comprising:
   identifying non-time bound content, the identifying including:
      receiving a list of recommended content from a content provider; and
      based on device data, from a receiver device, that is used to determine user interest, selecting one or more recommended content from the list to include in the non-time bound content;
   causing display of one or more content objects representing the non-time bound content on a viewing device of a user;
   receiving a selection of a first content object from the one or more content objects;
   responsive to receiving the selection of the first content object, determining whether the selection comprises a deep link associated with the first content object, the deep link providing a trigger to launch, at the receiver device of the user, a third-party service application associated with the first content object and to begin playback of an episode of the first content object associated with the deep link;
   based on the selection comprising the deep link, causing a third-party service application to launch on the receiver device of the user and automatically begin the playback of the episode of the first content object; and
   based on the selection not comprising the deep link, causing display of a detailed content view that provides an overview of the first content object.

\* \* \* \* \*